United States Patent [19]

Major

[11] E Re. 31,480

[45] Reissued Jan. 3, 1984

[54] FLUID CONTROL APPARATUS

[76] Inventor: Emery Major, 1210 Brickyard Cove Rd., Point Richmond, Calif. 94801

[21] Appl. No.: 362,111

[22] Filed: Mar. 26, 1982

Related U.S. Patent Documents

Reissue of:

[64] Patent No.: 4,313,464
Issued: Feb. 2, 1982
Appl. No.: 91,726
Filed: Nov. 6, 1979

[51] Int. Cl.[3] ..... F04B 11/00

[52] U.S. Cl. ..... 137/544; 137/568; 137/614.2; 417/542

[58] Field of Search ..... 137/544, 568, 614.2; 417/542

[56] References Cited

U.S. PATENT DOCUMENTS

| | | | |
|---|---|---|---|
| 1,927,582 | 9/1933 | Denk | 137/549 |
| 3,804,125 | 4/1974 | Sonneman | 417/540 |
| 3,810,716 | 5/1974 | Abrahams et al. | 137/544 |
| 3,816,029 | 6/1974 | Bowen et al. | 417/223 |
| 3,976,400 | 8/1976 | Major | 417/248 |
| 3,981,620 | 9/1976 | Abrahams et al. | 417/42 |
| 4,177,023 | 12/1979 | Kamiya et al. | 417/540 |

FOREIGN PATENT DOCUMENTS

| | | | |
|---|---|---|---|
| 2607843 | 9/1976 | Fed. Rep. of Germany | 137/550 |
| 956921 | 7/1962 | United Kingdom | 137/560 |

*Primary Examiner*—A. Michael Chambers
*Attorney, Agent, or Firm*—Thomas R. Lampe

[57] ABSTRACT

Fluid control apparatus including inlet and outlet check valve assemblies connected to a mounting block, filter means operatively associated with the check valve assemblies and a pulse damper device positioned on the mounting block for maintaining a continuous pressure on fluid after it has passed through the check valve assemblies.

9 Claims, 4 Drawing Figures

FLUID CONTROL APPARATUS

Matter enclosed in heavy brackets [ ] appears in the original patent but forms no part of this reissue specification; matter printed in italics indicates the additions made by reissue.

*This is an application for reissue of U.S. Pat. No. 4,313,464, granted February 2, 1982.*

BACKGROUND OF THE INVENTION

The present invention relates to an improved fluid control apparatus with particular application to the field of high pressure, positive displacement pumps, examples of which are shown in the following U.S. Pat. Nos. 3,288,079, 3,301,189, 3,372,647, 3,666,382, 3,792,939, 3,976,400 and 3,981,620.

Such pumps are useful in a number of fields, including chromatography, wherein it is desired to deliver fluids in a pulse-free, high pressure continuous flow stream. It is conventional in such arrangements to deliver the fluid by means of a reciprocating pump through valve and filter assemblies. The components of the valve and filter assemblies must be secured together in fluid tight fashion to insure not only that all liquid passing therethrough proceeds through the filter, but also that no leakage occurs under the high pumping pressures employed. In carrying out these objectives, prior art systems have incorporated seal arrangements which have restricted fluid flow and have required periodic adjustment by the operator to maintain their high pressure fluid integrity. Fluid control apparatus of the aforedescribed prior art type has also been used with pulse damper devices of various types to maintain fluid pressure in the system so that no major compliance or contracting of components downstream occurs during operation thereof. Such pulse damper mechanisms have been characterized by their relatively large size and the fact that they cannot readily be adjusted to accommodate different system pressures.

SUMMARY AND OBJECTS OF THE INVENTION

It is therefore an object of the present invention to provide improved fluid control apparatus for fluid being pumped under high pressures which incorporates valve assemblies and cooperating filter means incorporating improved seal arrangements which do not restrict flow nor require significant adjustment during the life thereof.

It is a further object of the present invention to provide a fluid control apparatus incorporating a pulse damper device which is compact in construction and may be readily adjusted to accommodate different fluid pressures.

It is yet another object of the present invention to provide a fluid control apparatus wherein check valve assemblies and a pulse damper device operatively associated therewith may be mounted on a common mounting block so that the apparatus is of a compact nature, readily transportable in unitary form.

The above and other objects have been attained inaccordance with the present invention by providing inlet and outlet check valve assemblies secured to a mounting block having a throughbore formed therein providing fluid flow communication between the assemblies. Filter means are provided upstream from the valve member and valve seat components of the assemblies and seals are provided between the assemblies and the mounting block, said seals being of a configuration insuring adequate fluid tight sealing between the valve assemblies and the mounting block while at the same time not exerting pressure on the filter nor otherwise restricting fluid flow.

Also mounted on the mounting block is a pulse damper device. The mounting block defines an interior in fluid flow communication with the outlet check valve assembly and a dispenser orifice. A piston is slidably positioned in the interior and responsive to fluid pressure therein to move away from the dispenser orifice. Biasing means in the form of a coil spring, which may be readily removed and replaced if desired, continuously urges the piston toward the dispenser orifice.

Other objects will be apparent from the following more detailed description and accompanying drawings in which:

DRAWINGS

DETAILED DESCRIPTION

Figure 1:
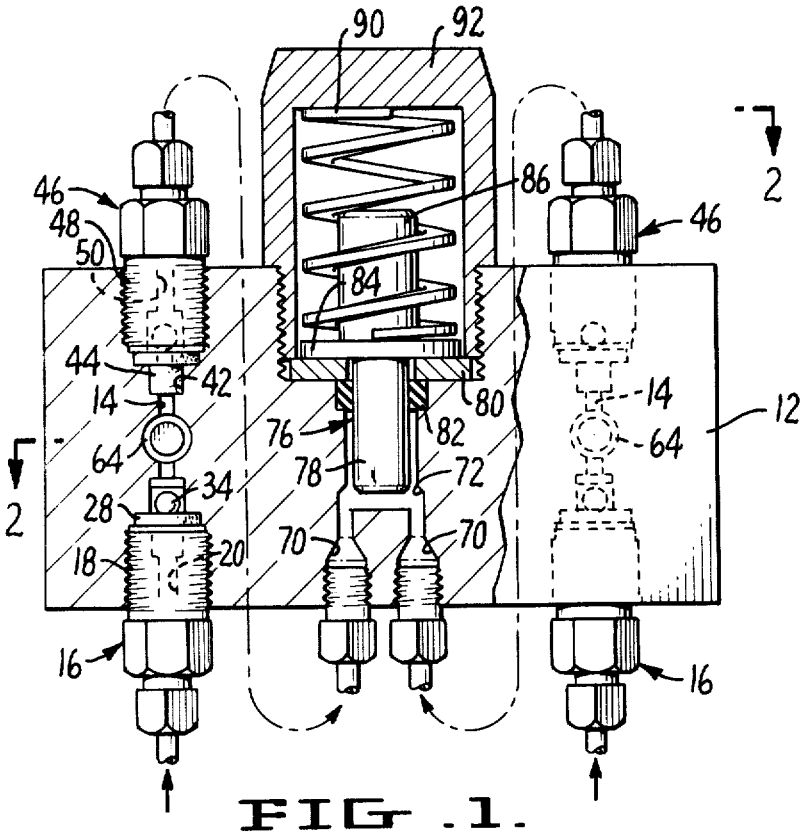
FIG. 1 is a cross sectional elevational view, partially broken away, of apparatus constructed in accordance with the teachings of the present invention.
Figure 2:
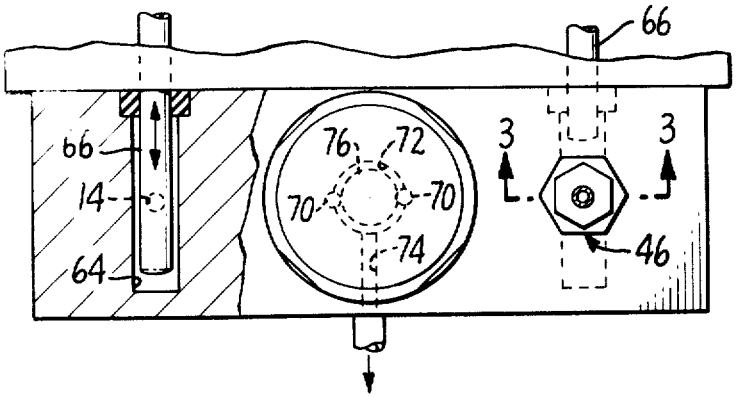
FIG. 2 is a cross-sectional view taken along line 2—2 in FIG. 1.
Figure 4:
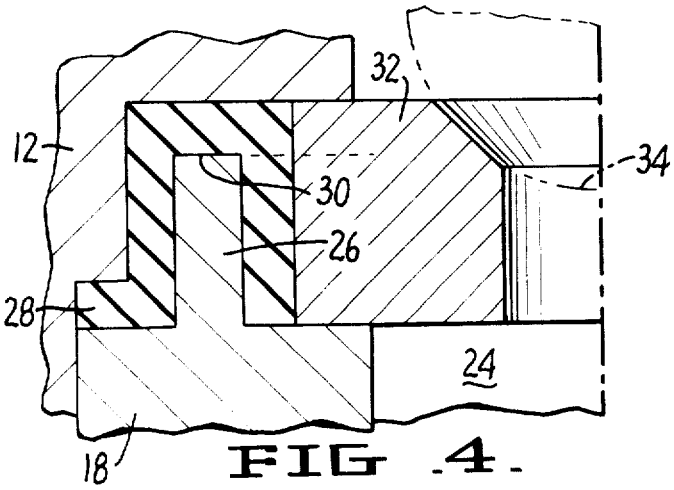
FIG. 4 is an enlarged elevational view of a portion of a seal employed in the system between a check valve assembly and the mounting block.
Figure 3:
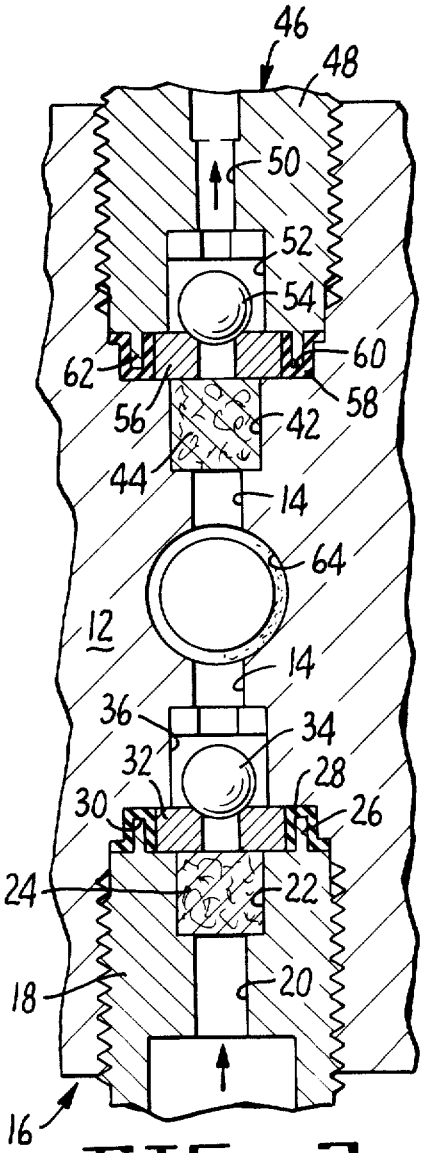
FIG. 3 is a cross-sectional view taken along line 3—3 in FIG. 2.

Referring now to the drawings, apparatus constructed according to the teachings of the present invention includes a mounting block 12 having throughbores 14 formed therein. Threadedly engaged to the mounting block at one end of each throughbore is an inlet valve assembly 16 having a body portion 18 defining a throughbore 20. The throughbore 20 is enlarged at its upper end to provide a filter chamber 22 within which filter 24 is disposed. The filter may be constructed of any suitable material, such as sintered stainless steel, ceramic material, etc., capable of filtering out particulate matter from the fluid passage thereto.

Valve assembly body portion 18 has an upstanding annular boss 26 surrounding the assembly throughbore.

A valve assembly seal 28 is positioned over the boss with the boss being received in an annular recess 30 defined by the seal. Confined within valve assembly seal 28 is a valve seat 32 defining a central passageway which is blocked by a valve member 34 in the form of a ball unless displaced by fluid passing upwardly through the assembly. Ball 34 is movable within a valve chamber 36 defined by mounting block throughbore 14.

When inlet valve assembly 16 is screwed into position on the mounting block, pressure is exerted on the seal 28 by the assembly and the mounting block in the vicinity of boss 26. Further, deformation of the seal material, which may be of any suitable plastic material, for example, forms a fluid tight connection between the inlet valve assembly and valve seat 32. It will be appreciated that deformation of the seal will in no manner impede the flow of fluid through the system. It will be further appreciated that no constant adjusting need be performed by the operator to maintain the fluid-tight seal as is the case in some prior art arrangements.

At a location spaced from inlet valve assembly 16, throughbore 14 is enlarged to provide a second filter chamber 42 within which filter 44 is positioned. Filter 44 is disposed upstream from outlet valve assembly 46 threadedly engaged to the upper portion of the mounting block 12. Outlet valve assembly 46 has a body portion 48 defining a throughbore 50. Throughbore 50 is enlarged at the lower end thereof to form a valve chamber 52 accommodating ball valve number 54 therein. Ball valve 54 is positioned over the passageway of a valve seat 56 similar in construction to valve seat 32. Likewise, valve seat 56 is positioned in a valve assembly seal 58 similar in construction to valve assembly seal 28. Annular recess 60 of valve assembly 58 receives an annular boss 62 formed on body portion 48 and cooperates to provide a fluid-tight seal between the body portion, the valve seat and mounting block 12.

Each throughbore 14 is in communication with an outlet cylinder 64 of a high pressure pump of any desired type such as that shown for example in U.S. Pat. No. 3,976,400. A piston 66 is reciprocally mounted in each cylinder. Retraction thereof draws liquid into inlet valve assemblies 16, through filters 24, thus displacing balls 34. Forward motion of the pistons forces the liquid through filter 44 and hence through outlet valve assembly 46 displacing ball 54 in the process. It will be appreciated that pistons 66 move in alternate directions so that liquid is dispensed first from one outlet valve assembly and then from the other.

From each outlet valve assembly 46 the fluid passes through a suitable conduit arrangement and as shown by the arrows to one of a pair of fluid inlet orifices 70 formed in the bottom of mounting block 12. Each orifice 70 leads to a primary housing interior 72 defined by the mounting block. Also in communication with interior 72 is an outlet orifice 74 which leads to a predetermined location in the system such as chromatographic equipment. A piston 76 having a lower ram portion 78 is positioned within the interior 72. The ram portion passes through the aperture of a retainer ring 80 positioned above interior 72 which holds a seal 82 in position in fluidtight communication with the piston.

The piston additionally comprises a flange 84 integrally formed with the ram portion. Boss 86 having a circular cross section is integrally attached to the top of the flange. A coil compression spring 90 of spring steel or the like is positioned about boss 86 and bears against the upper surface of flange 84. A housing 92 in the shape of an inverted cup is threadedly secured to mounting block 12 and bears against retainer ring 80. The upper portion of housing 92 constitutes a bearing surface engaging spring 90 and maintaining the spring in compression against piston 76.

When pressurized fluid enters interior 72 through orifices 70, piston 76 will move upwardly against the urging of spring 90 when sufficient pressure is exerted within the interior. The piston 76 will continue to exert pressure on the fluid within interior 72 during the pumping operation as switch-over between the pistons of the associated pump takes place, thus dampening the undersireable pulses often associated with such switch-over.

It will be appreciated that the aforedescribed arrangement can be utilized with fluid pumped under varying pressures and coil springs having various strengths may be readily substituted for coil spring 90 depending upon the pressures that are in the system. This arrangement provides a degree of flexibility not found in prior art pulse damper system.

I claim:

1. Fluid control apparatus comprising in combination:

mounting means;

*at least one inlet check valve assembly mounted on said mounting means;* at least one [inlet] *outlet* check valve assembly mounted on said mounting means in fluid flow communication with said inlet check valve assembly, each of said check valve assemblies including a movable valve member and a valve seat cooperable to permit passage of fluid therethrough in a predetermined direction;

filter means operatively associated with each of said check valve assemblies for removing particulate matter from liquid passing through said check valve assemblies; and a pulse damper device comprising a primary housing interior defined by said mounting means in fluid flow communication with said outlet check valve assembly and a dispenser orifice formed in said mounting means, a piston including a ram portion slidably positioned in said primary housing interior and responsive to fluid pressure in said primary housing interior to move away from said dispenser orifice, a coil compression spring continuously urging said piston toward said dispenser orifice, and a spring housing mounted on said mounting means for accomodating said coil compression spring and having a bearing surface maintaining said spring in compression against an element of said piston, seal means disposed between said primary housing and said spring housing and having an aperture within which said piston ram portion is slidably disposed, said seal means maintaining the housing interior, the coil compression spring and the piston element out of contact with said fluid.

2. The apparatus of claim 1 wherein said piston element comprises a flange in engagement with said coil compression spring within said spring housing.

3. The apparatus of claim 1 wherein the mounting means defines a throughbore for fluid flow communication between said check valve assemblies, said throughbore including a valve chamber receiving the valve member of said inlet check valve assembly and a filter chamber receiving the filter means associated with said outlet check valve assembly.

4. The apparatus according to claim 3 wherein a second filter receiving chamber is formed in each said inlet check valve assembly.

5. The apparatus according to claim 3 wherein valve assembly seals are disposed between each of said check valve assemblies and said mounting means.

6. The apparatus according to claim 5 wherein said check valve assembly valve seats are positioned in said valve assembly seals.

7. The apparatus of claim 1 wherein a plurality of inlet check valve assemblies and a plurality of outlet check valve assemblies are mounted on said mounting means, the outlet check valve assemblies being in fluid flow communication with said primary housing interior through said mounting means.

8. The apparatus of claim 1 wherein said spring housing comprises an inverted cup releasably secured to said mounting means whereby coil compression spring replacement is facilitated.

9. The apparatus of claim 1 wherein said piston further comprises a boss positioned in said spring housing, said coil compression spring being disposed about said boss and said boss and ram being positioned on opposite sides of said flange.

* * * * *